United States Patent [19]

Kashiwagi

[11] Patent Number: 4,705,993
[45] Date of Patent: Nov. 10, 1987

[54] HORIZONTAL DEFLECTION CIRCUIT HAVING A VARIABLE RETRACE PERIOD

[75] Inventor: Shigeru Kashiwagi, Iwai, Japan

[73] Assignee: Victor Company of Japan, Ltd., Japan

[21] Appl. No.: 853,406

[22] Filed: Apr. 18, 1986

[30] Foreign Application Priority Data

Apr. 19, 1985 [JP] Japan .................................. 60-84331

[51] Int. Cl.⁴ ........................ H01J 29/70; H01J 29/76
[52] U.S. Cl. .................................................... 315/408
[58] Field of Search ................................ 315/408, 399

[56] References Cited

U.S. PATENT DOCUMENTS 4,019,093  4/1977  Klein .................................... 315/408
4,238,714  12/1980  Sumi .................................... 315/408
4,513,228  4/1985  Teuling ................................ 315/408

*Primary Examiner*—Theodore M. Blum

*Attorney, Agent, or Firm*—Lowe, Price, LeBlanc, Becker & Shur

[57] ABSTRACT

A horizontal deflection circuit comprises an oscillator responsive to a horizontal sync pulse applied thereto for generating a first oscillation at the frequency of the sync pulse. A first switching device is responsive to a first half cycle of the first oscillation to cause a ramp current to be generated in a resonant circuit. The resonant circuit comprises a deflection coil and a first capacitor to produce a second, half-cycle oscillation immediately following a complete cycle of the first oscillation to define the retrace period of the circuit. A second switching device when enabled is responsive to a second half cycle of the first oscillation. The second switching device is enabled by operating a manually controlled switch. The enabled second switching device intermittently couples a second capacitor to the first capacitor of the resonant circuit to vary the retrace period.

13 Claims, 3 Drawing Figures

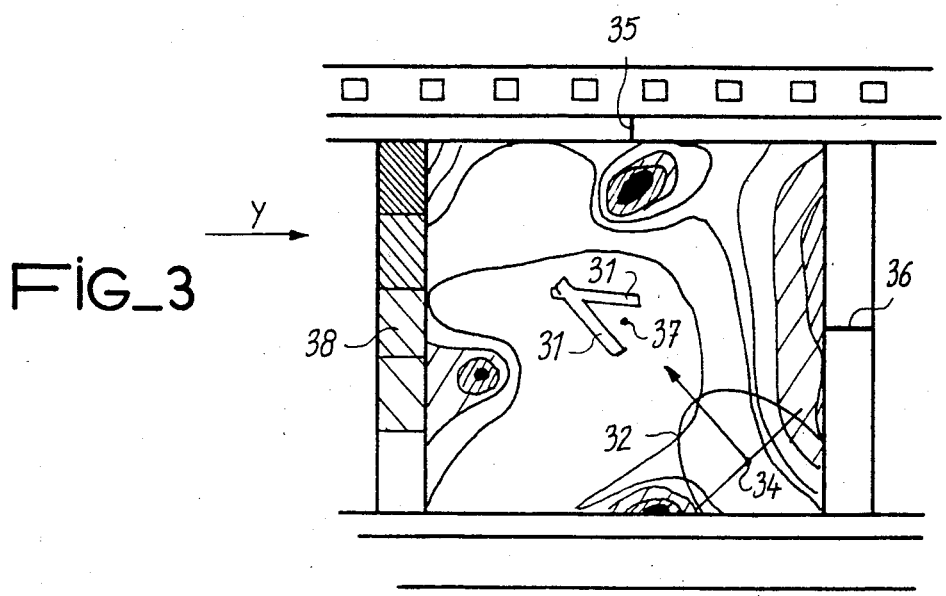
FIG_3
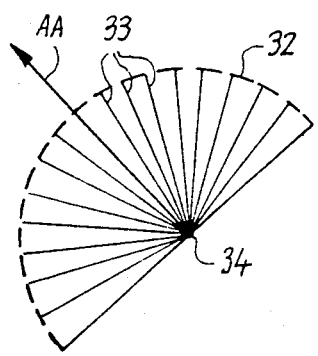
FIG_4
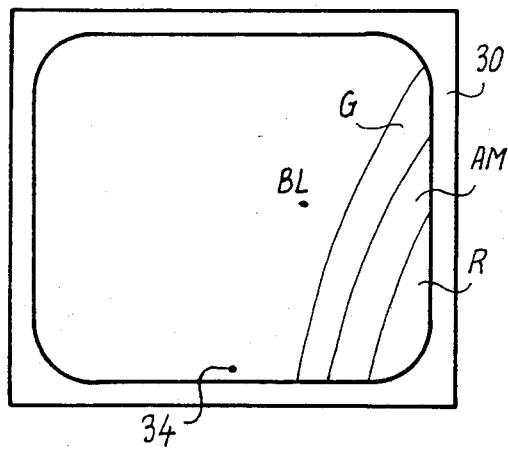
FIG_5

HORIZONTAL DEFLECTION CIRCUIT HAVING A VARIABLE RETRACE PERIOD

BACKGROUND OF THE INVENTION

The present invention relates generally to horizontal deflection circuits for cathode ray tubes, and more specifically to a horizontal deflection circuit having a retrace period which is variable in response to operation of a manually controlled switch.

There is often a need to operate a cathode ray tube with a variable line frequency to make it compatible with different line scanning systems. It is also desirable that the line scan retrace period be made variable with thresone variable trace period for adjusting the horizontal deflection amplitude of a raster.

One prior horizontal deflection circuit as described in Japanese Utility Model Provisional Specification No. 60-18965 employs a variable frequency oscillator for generating a variable frequency oscillation in response to horizontal sync pulses supplied from an external source. A switching device comprising a transistor and a diode is provided for switching the frequency of a variable frequency resonant circuit that determines the retrace period depending on whether the transistor is turned on or off. The turn-on of the transistor is effected by a DC bias supplied from a voltage source to the base of that transistor when a manually controlled switch is closed. This DC bias is applied to the transistor as long as the switch is maintained in the closed condition. One disadvantage of the prior deflection circuit is that, since a large collector current flows through the switching transistor when it is turned on, a large base current needs to be supplied to that transistor to switch it into a fully conductive state. Furthermore, the switching transistor must be capable of withstanding a high voltage flyback pulse which is generated in the deflection circuit during the retrace period and the transistor of this type has a very small value of current amplification. Therefore, a substantial amount of power is needed to drive the switching transistor.

SUMMARY OF THE INVENTION

It is therefore an object of the present invention to provide a horizontal deflection circuit for a cathode ray tube which requires a small amount of power for switching the retrace period between different values.

The horizontal deflection circuit of the invention comprises an oscillator responsive to a horizontal sync pulse applied thereto for generating a first oscillation at the frequency of the sync pulse. A first switching device is responsive to a first half cycle of the first oscillation to cause a ramp current to be generated in a resonant circuit. The resonant circuit comprises a deflection coil and a first capacitor to produce a second, half-cycle oscillation immediately following a complete cycle of the first oscillation to define the retrace period of the circuit. While a second switching device is enabled by operation of a manually controlled switch, it is responsive to a second half cycle of the first oscillation for intermittently coupling a second capacitor to the first capacitor of the resonant circuit to vary the retrace period.

BRIEF DESCRIPTION OF THE DRAWINGS

The present invention will be described in further detail with reference to the accompanying drawings, in which:

FIG. 2 is a timing diagram associated with the circuit of FIG. 1; and

DETAILED DESCRIPTION

Figure 1:
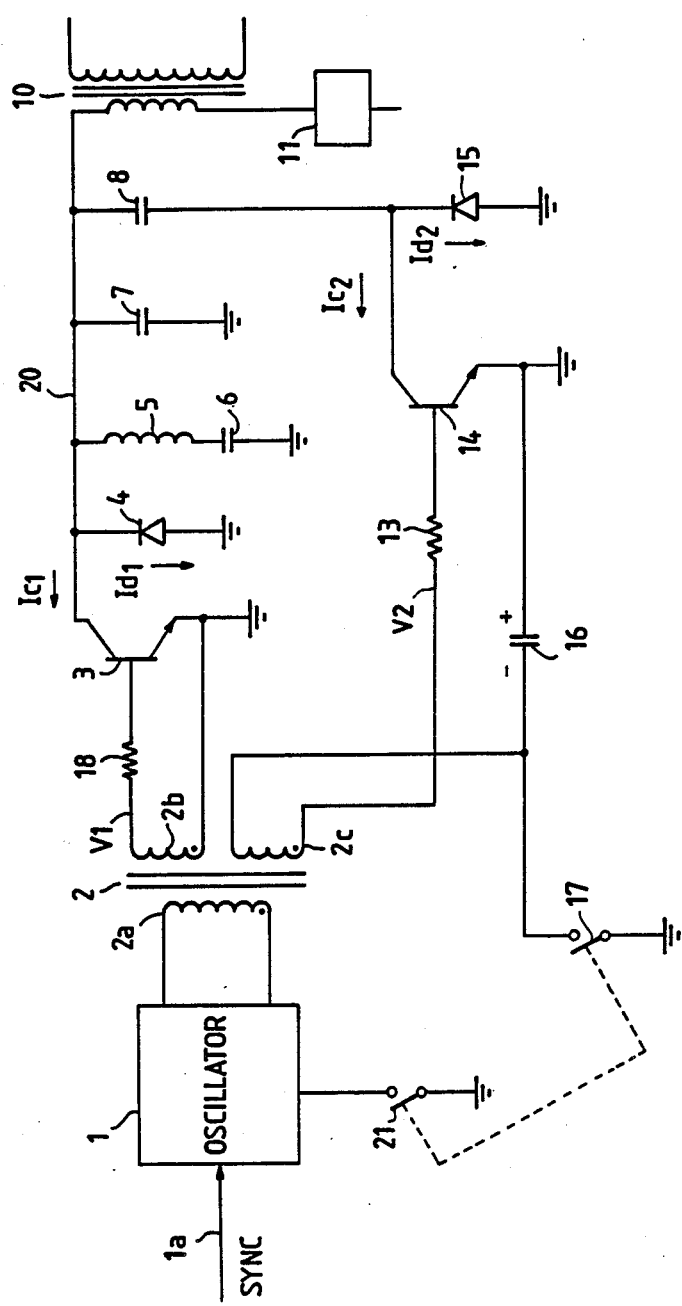
FIG. 1 is a circuit diagram of a horizontal deflection circuit of the invention.

Referring now to FIG. 1, there is shown a variable frequency horizontal deflection circuit according to an embodiment of the invention. The deflection circuit comprises a variable line frequency oscillator 1 which generates a line-frequency current pulse through the primary winding 2a of a transformer 2 in response to a horizontal sync pulse supplied to its input line 1a from an external video signal source. The frequency of oscillator 1 is variable in response to operation of a frequency changeover switch 21 so that it conforms to the repetition frequency of the applied sync pulse. Transformer 2 has a pair of secondary windings 2b and 2c. Secondary winding 2b develops a voltage plse V1 in response to the sync pulse and applies it through a current-limiting resistor 18 across the base and emitter of a switching transistor 3 which forms a first switching device with a damper diode 4 connected in antiparallel relationship with the transistor, i.e., the transistor emitter-collector path and the diode conduct in opposite directions between line 20 and ground. The collector of transistor 3 is connected to a line 20 to which a DC source voltage is applied from a voltage regulator 11 through the primary of a flyback transformer 10. To the line 20 is connected a parallel circuit including a series circuit of a horizontal deflection coil 5 and a nonlinearity correction capacitor 6, a first resonant capacitor 7 and a second resonant capacitor 8 which is connected from line 20 to ground through a second switching device formed by a switching transistor 14 and a diode 15 which is connected in antiparallel relationship with the collector-emitter path of transistor 14.

Capacitors 7 and 8, deflection coil 5 and the primary of flyback transformer 10 form a variable frequency resonant circuit which determines the retrace period of the deflection circuit depending on whether transistor 14 is turned on or off to conform to the variable line frequency.

Secondary winding 2c of transformer 2 applies a voltage pulse V2, which is opposite in polarity to voltage pulse V1, from one terminal of winding 2c through a current-limiting resistor 13 to the base of a switching transistor 14, the other terminal of winding 2c being connected through a storage capacitor 16 to the emitter of transistor 14 which is grounded. The collector of transistor 14 is connected to a junction between capacitor 8 and diode 15. A terminal between storage capacitor 16 and secondary winding 2c is connected to ground by a frequency changeover switch 17 which is ganged to the frequency changeover switch 21.

In response to the application of a sync pulse to oscillator 1, the transistor 3 and damper diode 4 turn on, causing a ramp current to flow through deflection coil 5, the ramp current branching to a component $Ic_1$ that flows through transistor 3 and a component $Id_1$ that passes through damper diode 4. As indicated by a waveform $I_{c1}$ in FIG. 2, the ramp current to the collector of transistor 3 starts in the negative direction at time $t_1$ in response to the leading edge of a voltage pulse V1, then flows in the positive directiron and then sharply drops to zero at time $t_2$ after a delay time "t" following the trailing edge of the voltage pulse V1. This delay is caused by minority carriers in transistor 3 being discharged upon the turn-off of transistor 3 following the trailing edge of pulse V1. There is no collector current in transistor 3 during the interval between times $t_2$ and $t_5$. The waveform of the combined currents passing through transistor 3 and diode 4 is indicated by a waveform represented as $I_{c1}+I_{d1}$. During the trace period between time $t_0$ and time $t_2$, the combined current ($I_{c1}+I_{d1}$) flows through the deflection coil 5 and during the retrace perid a cosine current flows in deflection coil 5. During the retrace period, a half-cycle, high voltage oscillation is generated in the resonant circuit to cause a flyback current to flow through the primary winding of the flyback transformer 10 so that it generates a high voltage at the flyback transformer secondary winding.

When switch 17 is in an off, i.e., open, state, storage capacitor 16 is charged by a current passing through the base-emitter path of transistor 14. The voltage so developed in capacitor 16 biases the transistor 14 into a nonconductive state. Thus, diode 15 is nonconductive and capacitor 8 is effectively disconnected from the deflection circuit. The retrace period is determined by the duration of one half cycle of the resonant frequency current generated by the circuit formed by deflection coil 5, capacitor 7 and the primary winding of flyback transformer 10 in response to the termination of a trace period at time $t_2$. The initiation of diode current $I_{d1}$ occurs at time $t_3$ so that the interval between times $t_2$ and $t_3$ determines the retrace period when switch 17 is in off-state.

When switch 17 is turned on, capacitor 16 is discharged, causing transistor 14 and hence diode 15 to be turned on in response to the leading edge of a voltage pulse V2 from secondary winding 2c. Under these circumstances, capacitor 8 is connected to the resonant circuit through the now conducting diode 15. An oscillation generated by the resonant circuit using additional capacitor 8 causes a collector current $I_{c2}$ to flow through transistor 14 during a quarter cycle of the oscillation and a diode current $I_{d2}$ to flow through diode 15 during a subsequent quarter cycle of the oscillation, so that the retrace period is determined by the interval between times $t_2$ and $t_4$.

It is seen therefore that when switch 17 is in an on-state the base current for driving the switching transistor 14 exists only during the retrace period. Thus, the amount of power needed to drive the transistor 14 is significantly reduced compared with the aforesaid prior art. If there is a need to vary the retrace period without altering the line frequency, oscillator 1 is modified to have a single constant frequency and switch 21 is eliminated.

Figure 3:
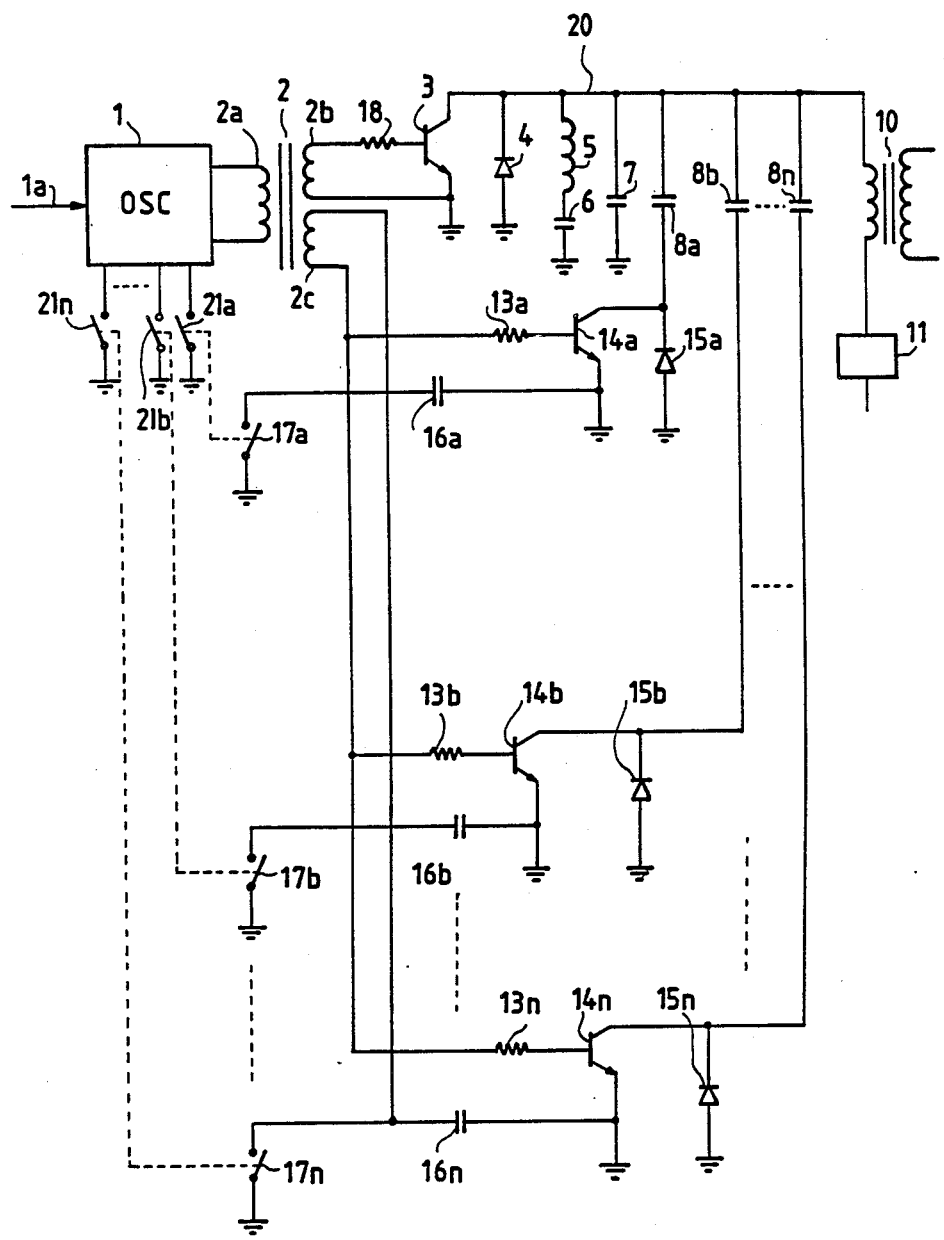
FIG. 3 is a circuit diagram of a modified embodiment having a plurality of switched resonant capacitors for varying the retrace period in multiple steps.

The retrace period can be varied in n steps as desired by providing n resonant capacitors $8a-8n$ and n associated capacitor-switching circuits as shown in FIG. 3. Switching circuits include transistors $14a-14n$, diodes $15a-15n$ and switches $17a-17n$. If it is desired to change the line frequency with changes in retrace period, switches $21a-21n$ are respectively ganged to switches $17a-17n$ to alter the resonant frequency of oscillator 1.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A horizontal deflection circuit for a cathode ray tube, comprising:
   an oscillator responsive to a horizontal sync pulse applied thereto for generating a first oscillation at the frequency of the sync pulse;
   a resonant circuit comprising a deflection coil and a first capacitor;
   first switching means connected to said resonant circuit for generating a ramp current in said deflection coil in response to a first half cycle of said first oscillation and causing a second, half-cycle oscillation in said resonant circuit following a complete cycle of the first oscillation;
   a second capacitor;
   a manually controlled switch; and
   second switching means selectively enabled in response to operation of said manually controlled switch for intermittently coupling said second capacitor to said first capacitor in response to a second half cycle of said first oscillation.

2. A horizontal deflection circuit as claimed in claim 1, wherein said oscillator is a variable frequency oscillator for generating an oscillation at a variable frequency in response to operation of said switch.

3. A horizontal deflection circuit as claimed in claim 1, wherein said second switching means includes a third, storage capacitor, a transistor for charging said third capacitor through a base-emitter path of the transistor in response to said second half cycle of said oscillation when said manually controlled switch is not operated so that said transistor is biased into nonconduction by a voltage developed in said third capacitor, said third capacitor being arranged to be short-circuited in response to the operation of said manually controlled switch for allowing said transistor to couple said second capacitor to said first capacitor in response to said second half cycle of said oscillation.

4. A horizontal deflection circuit as claimed in claim 3, wherein said second switching means further includes a diode connected in antiparallel relationship with a collector-emitter path of said transistor.

5. A horizontal deflection circuit as claimed in claim 1, further comprising a transformer having a primary winding connected to the output of said oscillator, a first secondary winding connected to said first switching means and a second secondary winding connected to said second switching means.

6. A horizontal deflection circuit for deriving a sawtooth current having one of N selected frequencies equal to the frequency of a synchronizing waveform, where N is an integer greater than one, comprising a resonant circuit including a horizontal deflection coil, a first capacitor, $(N-1)$ second capacitors, all of said second capacitors being selectively connected in parallel with the coil; first switch means connected in parallel with the coil and said first capacitor, $(N-1)$ second switch means, each of said second switch means being connected in series with one of the $(N-1)$ second capacitors so that when the kth second switch means is closed the kth second capacitor is connected in parallel with the coil, means for selectively enabling said second switch means, and means responsive to the synchronizing waveform for closing said first switch means while opening the enabled second switch means and for opening said first switch means while closing the enabled second switch means, the resonant circuit being connected to said first and second switch means and having components such that while all of the second switch means are disabled a bipolarity tracing current for the coil and a retrace current for the coil flow from the resonant circuit to the first switch means and while the kth switch means is enabled a bipolarity tracing current for the coil flows from the resonant circuit to the first switch means and a bipolarity retrace current for the coil flows from the resonant circuit to the second capacitor series connected to the kth second switch means, where k is selectively any one of the (N−1) integers.

7. The horizontal deflection circuit of claim 6 wherein each of the switch means includes a transistor emitter-collector path shunted by a diode polarized to conduct current in a direction opposite to the direction of current flow through the emitter-collector path shunted by the diode.

8. The horizontal deflection circuit of claim 7 wherein the transistor of each of the second switch means includes a base-emitter junction, the selectively enabling means including manually operated switch means for selectively enabling the base-emitter junction of each second switch means to be forward biased by the means for opening and closing.

9. The horizontal deflection circuit of claim 8 wherein the means for opening and closing includes a transformer winding for applying a bi-level voltage to each of the base-emitter junctions, (N−1) further capacitors, the kth further capacitor being in series with the transformer winding and the kth base-emitter junction, the kth manually operated switch means including normally open contacts connected so that when they are closed a terminal between the winding and further capacitor k is shunted.

10. The horizontal deflection circuit of claim 6 wherein said resonant circuit includes a winding of a flyback transformer connected to a DC voltage source.

11. A horizontal deflection circuit for deriving a sawtooth current having a frequency equal to the frequency of a synchronizing waveform comprising a resonant circuit including a horizontal deflection coil, a first capacitor connected in parallel with the coil, a second capacitor selectively connected in parallel with the coil, first switch means connected in parallel with the coil and said first capacitor, second switch means connected in series with said second capacitor so that when the second switch means is closed the second capacitor is connected in parallel with the coil, means responsive to the synchronizing waveform for closing said first switch means while opening the second switch means and for opening said first switch means while closing the second switch means, the resonant circuit being connected to said first and second switch means and having components such that a bipolarity tracing current for the coiil flows from the resonant circuit to the first switch means and a bipolarity retrace current for the coil flows from the resonant circuit to the second capacitor and second switch means.

12. The horizontal deflection circuit of claim 11 wherein each of the switch means includes a transistor emitter-collector path shunted by a diode polarized to conduct current in a direction opposite to the direction of current flow through the emitter-collector path shunted by the diode.

13. The horizontal deflection circuit of claim 11 wherein said resonant circuit includes a winding of a flyback transformer connected to a DC voltage source.

* * * * *